(No Model.)
D. BRAINERD.
SUPPORT FOR BICYCLES.
No. 527,767. Patented Oct. 23, 1894.
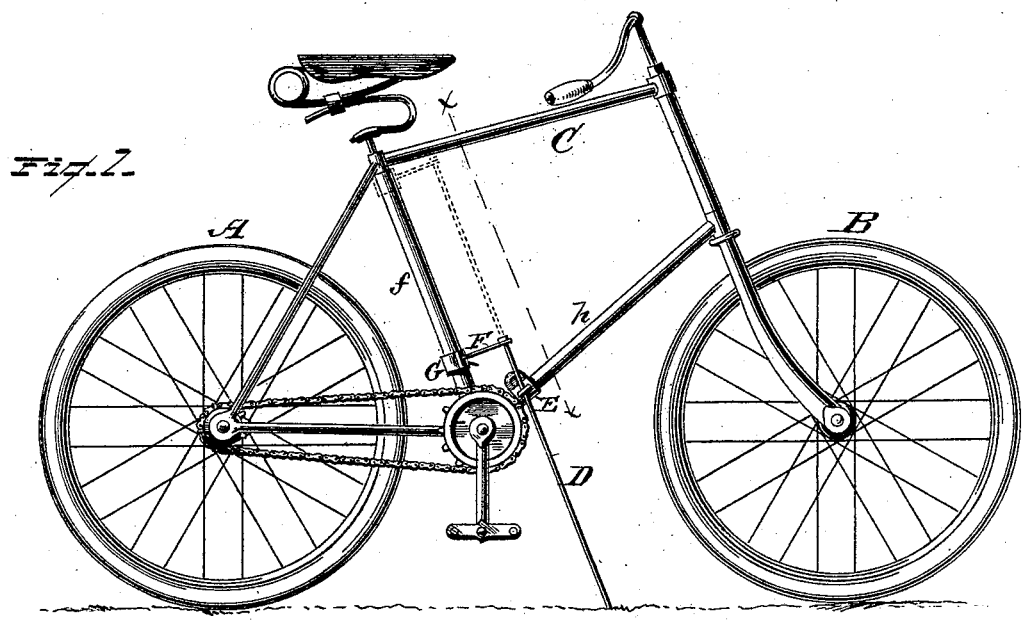
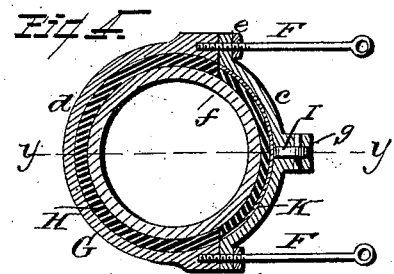
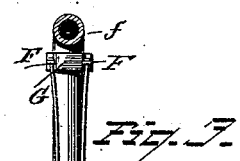
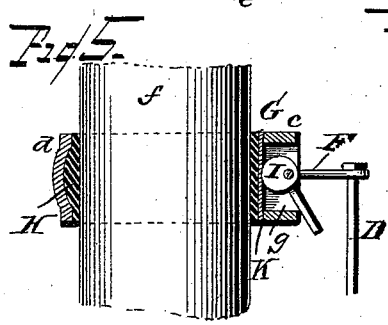
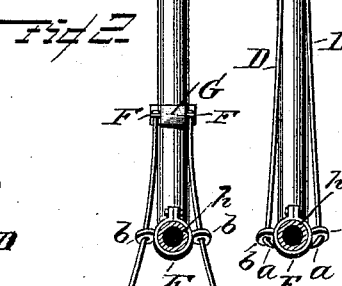
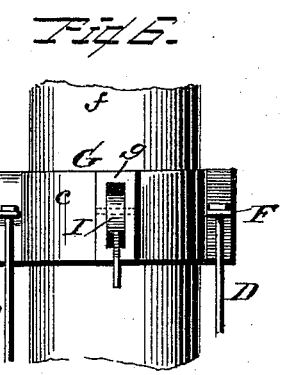
Witnesses
C. J. Williamson.
G. Goddard.
Inventor
David Brainerd.
per Chas. H. Fowler
Attorney.

UNITED STATES PATENT OFFICE.

DAVID BRAINERD, OF DENVER, COLORADO.

SUPPORT FOR BICYCLES.

SPECIFICATION forming part of Letters Patent No. 527,767, dated October 23, 1894.

Application filed June 26, 1894. Serial No. 515,713. (No model.)

*To all whom it may concern:*

Be it known that I, DAVID BRAINERD, a citizen of the United States, residing at Denver, in the county of Arapahoe and State of Colorado, have invented certain new and useful Improvements in Supports for Bicycles; and I do hereby declare that the following is a full, clear, and exact description of the same, reference being had to the annexed drawings, making a part of this specification, and to the letters of reference marked thereon.

The present invention has for its object to provide a simple and effective device that may be readily attached to any bicycle to support it in an upright position after the rider has dismounted, thereby removing the necessity of leaning or resting the bicycle against some stationary object in order to support it and prevent it falling over.

The above object I attain by a device constructed substantially as shown in the drawings and hereinafter described and claimed.

Figure 1 of the drawings represents a side elevation of a bicycle showing my improved attachment in a raised and lowered position in dotted and full lines respectively; Fig. 2, a detail sectional view taken on line $x\ x$ of Fig. 1, showing the device in a position to support the bicycle; Fig. 3, a similar view showing the device raised and the position it will assume when the bicycle is in motion; Fig. 4, a horizontal section on an enlarged scale showing the means of attaching the device to the frame of the bicycle and the means employed for releasing it to bring it in position to support the bicycle when not in use. Fig. 5 represents a sectional view taken on line $y\ y$ of Fig. 4; Fig. 6, a side elevation thereof.

In the accompanying drawings A B represent the wheels of the bicycle and C the frame thereof, to which is connected the usual seat and driving mechanism, all of which may be of the ordinary construction, they forming no part of the invention, as my improved support is adapted for attachment to bicycles of any make or construction.

The support for the bicycle to retain it in an upright position when not in use and which forms the subject of the invention, consists of the spring rods D of suitable thickness which form legs when brought into position shown in full lines, Fig. 1 of the drawings, and support the bicycle without the necessity of resting it against any stationary object. The rods D may have spurs $a$ upon their lower ends to prevent the rods slipping when brought in contact with the ground, and also to prevent the rods spreading, said spurs also acting as stops to prevent them being pulled through the guides $b$ upon the sleeve E. The upper ends of the rods D are suitably connected to the outer ends of arms F, the inner ends of said arms being screw threaded to serve as bolts in connecting together the two sections $c\ d$ of the slidable collar G with the assistance of the screw-nuts $e$ upon said rods. The collar G is connected to the part $f$ of the bicycle frame so that it will freely slide thereon, and interposed between it and the collar is a packing ring H. A suitable releasing device is provided which holds the collar in an elevated position when the support is not in use, said device consisting in the present instance of a cam I pivoted to the section $c$ of the collar G. The section $c$ is shown as having a mortise $g$ in which is pivoted the cam, this means of connecting the cam to the collar being the most simple and practical. The cam may be connected to the collar in any suitable manner and the collar may be variously modified in its details of construction as circumstances may require. A protecting metal plate K is interposed between the cam and the packing or cushion to prevent injury to the latter by the cam cutting into it. When the cam is in position shown in Fig. 5 the packing or cushion H will be pressed against the part $f$ of the bicycle frame to produce a sufficient friction between the two to hold the collar in the position shown in dotted lines of Fig. 1 and the supporting rods up off the ground. When the rider wishes to dismount, the cam is released to remove the pressure upon the packing or cushion when the collar will slide down the part $f$ of the frame by its own gravity and to the position shown in full lines of Fig. 1.

The supporting rods being of spring metal they will spread apart as the collar descends and assume the position as indicated in Fig. 2, thereby providing a light and simple as well as durable means for supporting the bicycle in an upright position when not in use.

When the collar is raised, the guides $b$ upon the sleeve E will draw the spring rods together as shown in Fig. 3 in which position the rods will be out of the way of the rider. The rods being of spring metal they act automatically in expanding and contracting as shown in Figs. 2 and 3 respectively.

Any suitable holding and releasing device may be substituted for the cam and any changes or modifications as would come within ordinary mechanical skill may be made without departing from the principle of the invention.

The sleeve E with its guides is connected to the part $h$ of the bicycle frame and remains stationary thereon.

Having now fully described my invention, what I claim as new, and desire to secure by Letters Patent, is—

1. A bicycle support consisting of a collar secured to a frame bar of the bicycle, said collar carrying a pair of eyes through which a pair of spring-legs are adapted to slide, and a second collar to which are secured the upper ends of the spring-legs, said second collar being adjustable along another frame bar for the purpose of lowering or raising the spring-legs into operative and inoperative positions respectively, substantially as described.

2. A bicycle support, consisting of a slidable collar, a packing or cushion, a metal bearing-plate, and a cam device for holding the collar stationary and releasing it, spring rods connecting with the collar and having stops upon their lower ends, and guides through which the rods extend, substantially as and for the purpose set forth.

In testimony that I claim the above I have hereunto subscribed my name in the presence of two witnesses.

DAVID BRAINERD.

Witnesses:
S. A. RATHBUN,
T. H. MARSHALL.